Figure 1:
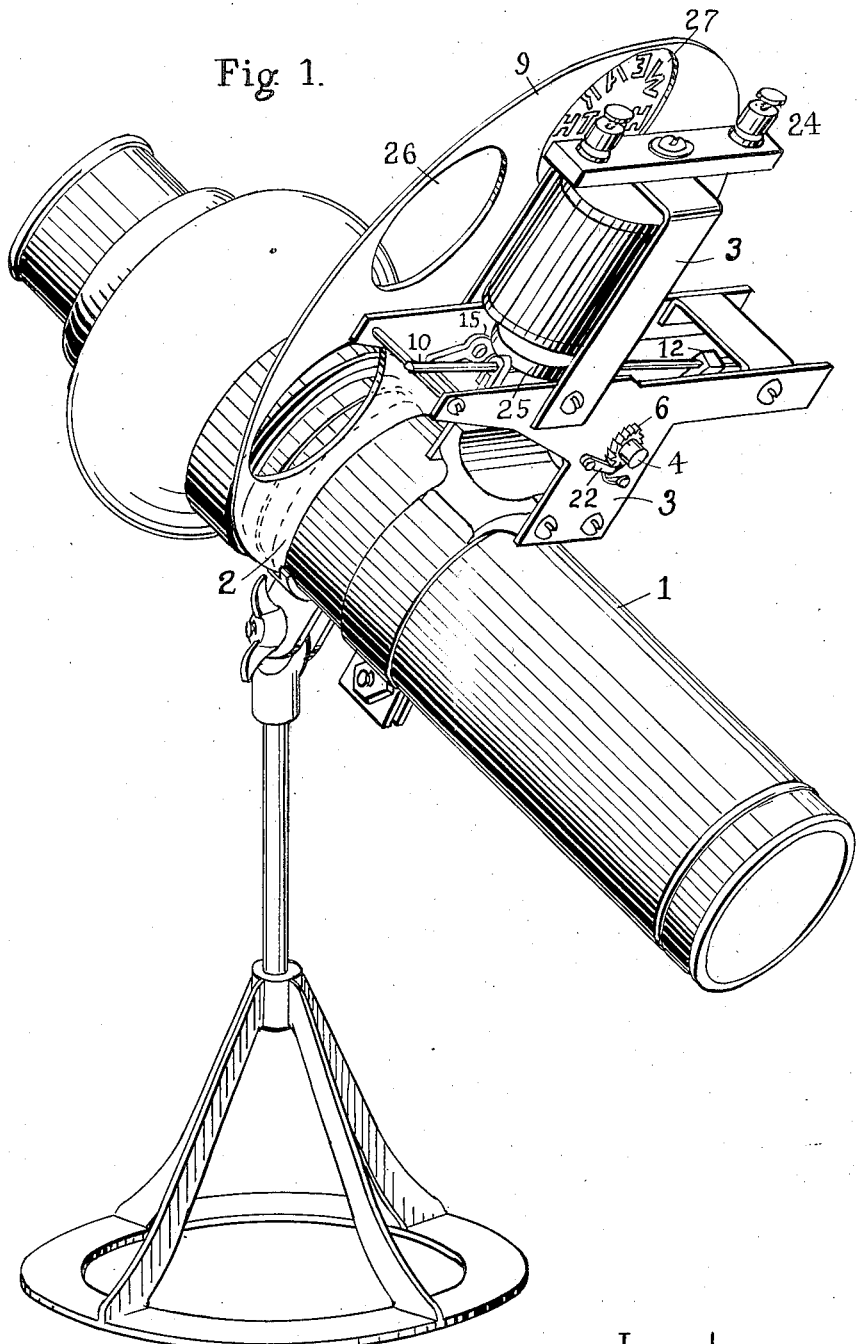

L. J. GODDARD.
DISPLAYING APPARATUS.
APPLICATION FILED NOV. 16, 1911.

1,102,735.

Patented July 7, 1914.
3 SHEETS—SHEET 3.

Witnesses:
Samuel W. Balch
Hugh H. Senior

Inventor,
Lester J Goddard
by Frank C. Cole
Attorney.

UNITED STATES PATENT OFFICE.

LESTER J. GODDARD, OF RAVENNA, OHIO.

DISPLAYING APPARATUS.

1,102,735.  Specification of Letters Patent.  Patented July 7, 1914.

Application filed November 16, 1911. Serial No. 660,573.

*To all whom it may concern:*

Be it known that I, LESTER J. GODDARD, a citizen of the United States of America, and a resident of the city of Ravenna, county of Portage, and State of Ohio, have invented certain new and useful Improvements in Displaying Apparatus, of which the following is a specification.

My invention relates to apparatus for the successive display of plates or their projections and has for its object such construction of the apparatus that the plates are brought into the desired position and held there the desired length of time.

My invention is of general application for the successive display of any reading matter, pictures, designs, charts, maps, figures, letters, numerals, etc., or combinations of them. I have illustrated it in connection with a projector for advertising purposes, and with a chart for optical purposes, but do not intend to limit it thereby.

The projector shown is of the well-known type commonly used for projecting advertisements onto pavements and is chosen merely for convenience of illustration. When my invention is applied thereto the plates are successively brought in line with the projecting lens and the advertisements successively projected onto the pavement or other screen. When my invention is used for this purpose it is convenient to regulate the procession of plates automatically by any desired means such as clock work, but as the latter is not a part of the invention it is not illustrated. In this connection I have shown the advertising matter arranged on a disk which rotates in the line of the projecting lens. This I believe to be the most convenient method when a small number of advertisements is to be displayed or when one advertisement is to alternate with a blank. I do not intend to be limited to this method as it is obvious other methods can be used and may be desirable when a large number of advertisements is to be displayed and my invention contemplates such methods. As shown the advertising matter is stenciled. This is a desirable and inexpensive method, but I do not intend to be limited thereto as my invention contemplates the other well known methods employed in projection onto a screen.

The optical chart shown is one of the many in use for making refractive tests of the eye. As illustrated, the letters to be displayed are brought successively in line with an aperture in an opaque frame. As the length of time which it is desired to display any one letter or group of letters is variable it is convenient to operate the mechanism manually as by pressing a button, but as this forms no part of my invention it is not illustrated. As in the case of the projector just referred to the letters are arranged on a rotating disk, but I do not intend to be limited to this method as other methods may be employed and my invention contemplates such methods.

I use the word "plate" as indicating that portion of matter to be displayed at any one time and not as indicating a mechanical entity.

Figure 2:
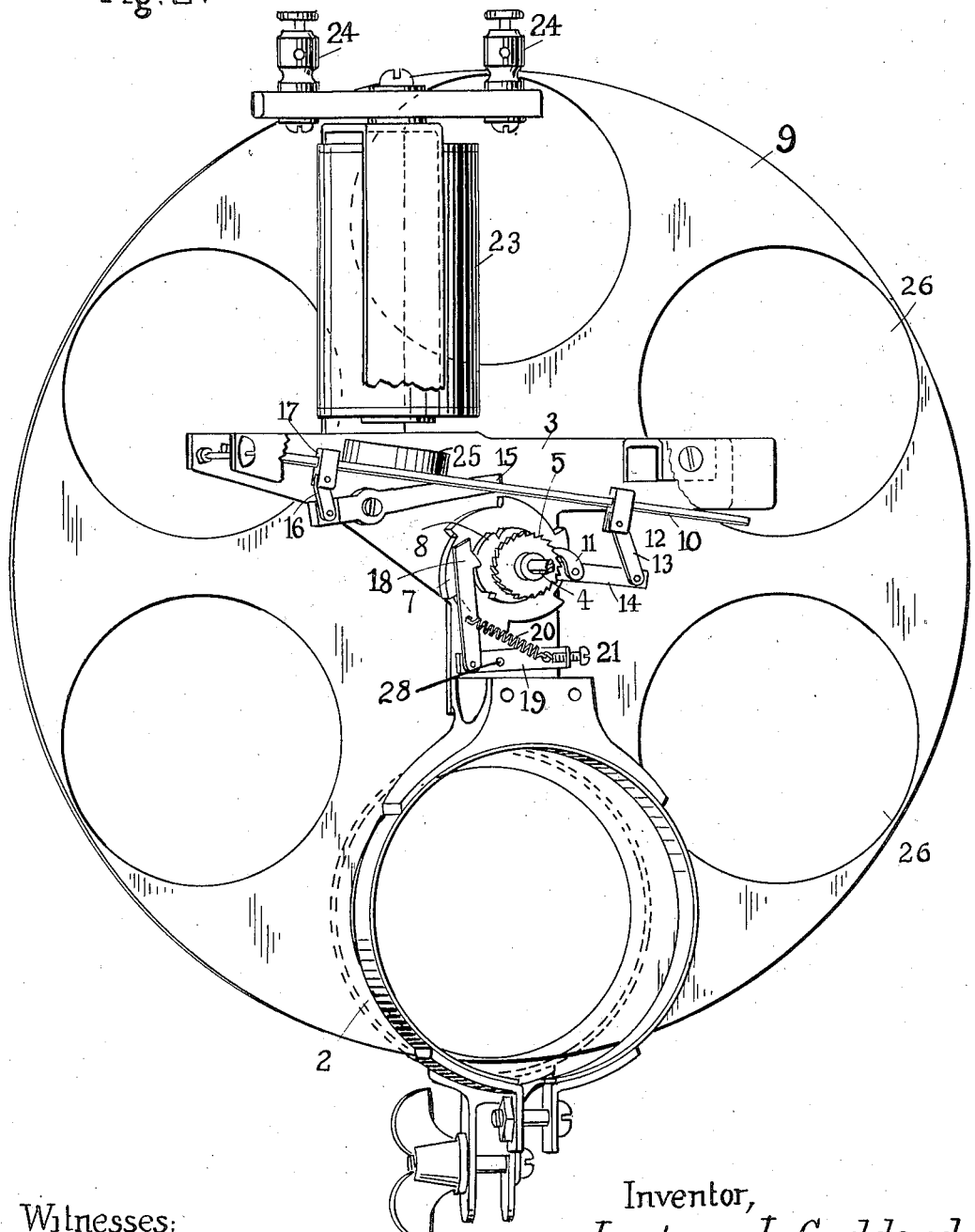
Figure 3:
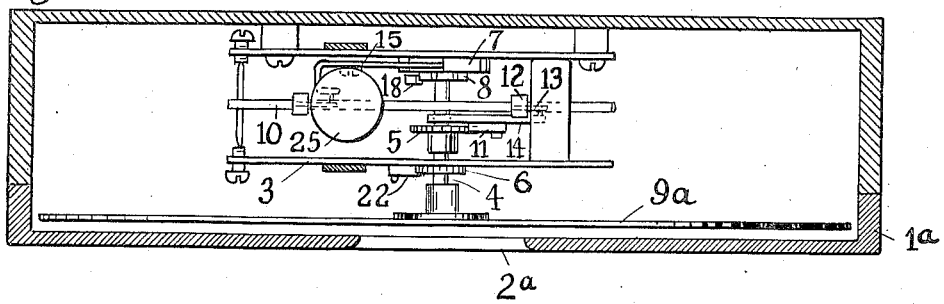
Figure 4:
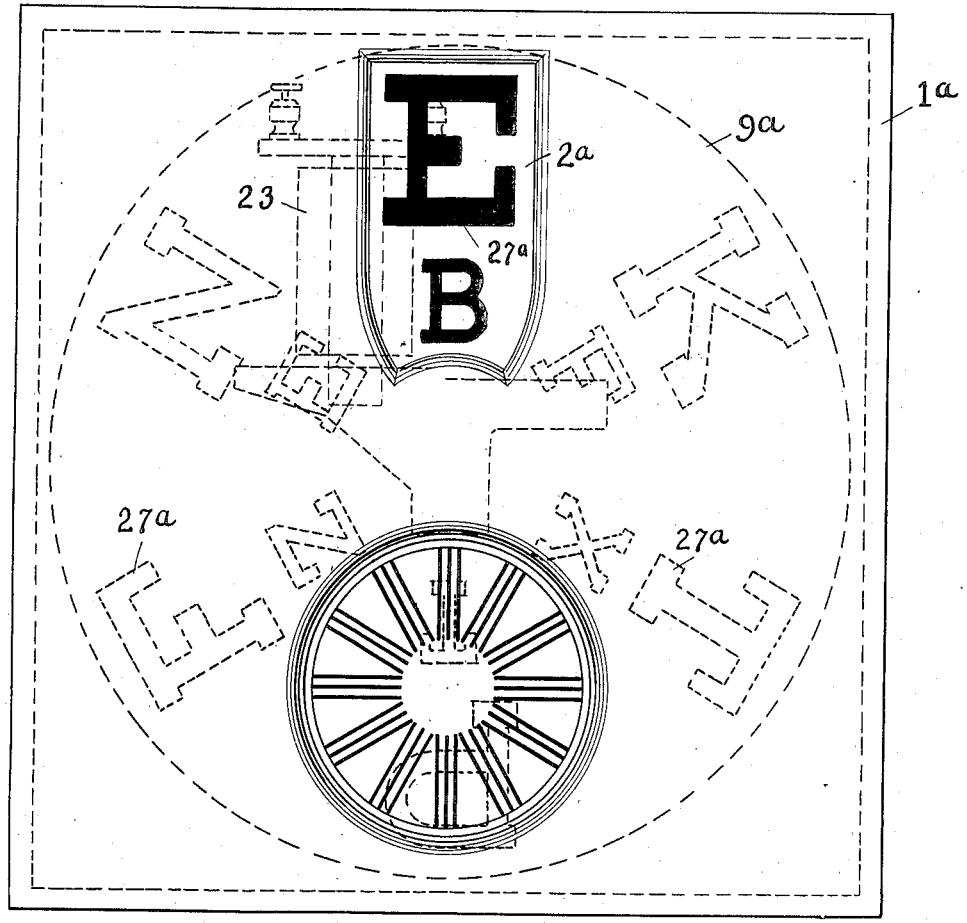

In the three sheets of drawings which form a part of this application Figure 1 is a perspective of my invention applied to a projector; Fig. 2 is a front elevation thereof slightly turned and broken away; Fig. 3 is a plan of my invention applied to an optical chart, the frame for the chart being in horizontal section; and Fig. 4 is a front elevation thereof, all of the figures showing the mechanism in its displaying position.

Considering first the use of the invention in connection with a projector, as illustrated in Figs. 1 and 2, the frame 1 of the projector is provided with a slot or aperture 2. Upon this frame is attached a mounting 3 in which is journaled a shaft 4. Rigidly mounted upon the shaft are a propelling ratchet 5, a holding ratchet 6, an arresting ratchet 7, a wheel 8 provided with teeth, and a disk 9. The holding ratchet and arresting ratchet face in opposite direction to the propelling ratchet. A lever 10 is pivotally connected with one end of the mounting 3. Pawl 11 is pivotally connected with the lever 10 and engages the teeth of the ratchet 5. As shown this pivoted connection is made through the agency of block 12, link 13, and arm 14, the end of which latter is loosely mounted on the shaft 4. This construction is a convenient one, but obviously not the only one which can be employed. Pawl 15 which engages ratchet 7 is pivoted to the mounting 3, and at the opposite end from the ratchet wheel is pivotally connected with the lever 10. The connection shown comprises a link 16 and block 17. This is a convenient construction, but obviously not the only one which can be employed. A pawl 18 which engages with the teeth of the wheel 8 is pivoted to an arm 19, which is adjustably attached to the mounting 3. This pawl is kept in such engagement with the teeth by means of a spring 20 which is fastened to the arm 19 in such a manner that its tension may be conveniently adjusted. The manner shown is by a screw 21. The spring-pressed pawl 22 is pivoted to the mounting 3 and engages the holding ratchet 6. An electro-magnet 23 is attached to the mounting 3 in such a position as to be over the lever 10 and is provided with two binding posts 24 24 through which current is supplied to the magnet. An armature 25 is attached to the lever 10 in line with the core of the magnet. The disk 9 may have a series of openings 26 26 in which can be fastened advertising plates 27 which are as shown disks stenciled with the desired advertising matter. Some of the plates may be blanks if desired. It is obvious that these plates need not be separate pieces from the disk 9 and in such a case the openings 26 would be omitted.

The device is so constructed and mounted on the projector that the disk 9 rotates through the aperture 2 and the advertising plates are successively brought in line with the projecting lens.

While I have thus far described my invention with respect to the projector, the details of construction are for the most part identical when used in connection with the optical chart and the corresponding parts bear the same reference numerals. In the case of the optical chart illustrated in place of the projector the frame 1ª is employed. This frame is provided with an aperture 2ª. A disk 9ª, which corresponds in function with the disk 9 is rigidly mounted upon the shaft 4 and carries the desired lettering arranged in plates 27ª. The apparatus is so mounted in the frame 1ª that the plates pass in succession before the aperture 2ª.

In operation the electro-magnet 23 is energized manually or automatically as already indicated. When energized the armature 25 is drawn toward the electro-magnet and retained in that position while the magnet is energized. As the armature is thus raised the pawl 11 turns the ratchet 5 and the plates 27 or 27ª are thereby advanced. The raising of the armature also brings the pawl 15 into engagement with the ratchet 7. This ratchet is provided with teeth equal in number to the plates, and the teeth are so placed that when the pawl 15 makes engagement with their faces, the plates 27 or 27ª are arrested in proper alinement with the apertures 2 or 2ª respectively. When the electro-magnet is deënergized, the armature falls and the engaging end of the pawl 15 is raised ready for the next advance. For a single display the electro-magnet need only be energized for a sufficient time to cause said advance and arrest. The holding ratchet 6 as shown being provided with a greater number of teeth than the number of plates 27 or 27ª coöperates with its engaging pawl 22 to prevent any rearward rotation of the disk 9; and forward rotation thereof, except as desired by energizing the magnet and regulated by ratchet 7 and pawl 15, is taken care of by the wheel 8 and the pawl 18. The teeth of this wheel are equal in number to the plates and are so arranged that the pawl is in engagement with their faces when the proper alinement of the plates and aperture is made. The faces of the advance side of the teeth are slightly out of alinement with the diameter of the wheel. This permits the pawl to ride up on the teeth when the magnet is energized, but by reason of spring 20 offers sufficient resistance against such a movement to prevent forward rotation of the disk when a lesser force from that exerted by a magnet is applied. Fineness of adjustment can be made by tilting the arm 19 around its holding and mounting pin 28 to change the position of the pawl 18 and insure correct alinement of the advertising plates 27 and 27ª with the apertures 2 and 2ª respectively when the disks 9 and 9ª are in their respective displaying positions.

It is to be understood that I do not desire to be limited to the exact details shown and described, for obvious modifications will occur to those skilled in the art.

Having thus described my invention, what I claim as new and desire to secure by Letters Patent of the United States, is—

1. In an advancing and holding mechanism for displaying-apparatus the combination of a mounting, a shaft journaled therein, a propelling ratchet mounted on the shaft, a pawl in engagement with the propelling ratchet, an armature with which the pawl is pivotally connected, an electro-magnet for intermittently actuating the armature, an arresting ratchet facing in opposite direction to the propelling ratchet, and a pawl pivoted to the mounting and pivotally connected to the armature in such a manner as to be brought into engagement with the arresting ratchet by the movement of the armature, substantially as described.

2. In an advancing and holding mechanism for displaying-apparatus the combination of a mounting, a shaft journaled therein, a propelling ratchet mounted on the shaft, a pawl in engagement with the propelling ratchet, an armature with which the pawl is pivotally connected, an electro-magnet for intermittently actuating the armature, an arresting ratchet facing in opposite direction to the propelling ratchet, a pawl pivoted to the mounting and pivotally connected to the armature in such a manner as to be brought into and out of engagement with the arresting ratchet by the movement of the armature, a holding ratchet mounted on the shaft and facing in the same direction as the propelling ratchet, and a pawl in engagement therewith, substantially as described.

3. In an advancing and holding mechanism for displaying-apparatus the combination of a mounting, a shaft journaled therein, plates supported from the shaft, a propelling ratchet mounted on the shaft, a pawl in engagement with the propelling ratchet, an armature with which the pawl is pivotally connected, an electro-magnet for intermittently actuating the armature, a wheel provided with teeth equal in number to the plates mounted on the shaft, a pawl in engagement therewith, an arm to which the pawl is pivotally mounted, said arm being adjustably attached to the mounting, substantially as described.

4. In an advancing and holding mechanism for displaying-apparatus the combination of a mounting, a shaft journaled in the mounting, plates supported from the shaft, a propelling ratchet mounted on the shaft, a pawl in engagement with the propelling ratchet, an armature with which the pawl is pivotally connected, an electro-magnet for intermittently actuating the armature, a holding ratchet mounted on the shaft and facing in the same direction as the propelling ratchet, a pawl in engagement therewith, an arresting ratchet mounted on the shaft and facing in opposite direction to the propelling ratchet, a pawl pivoted to the mounting and pivotally connected to the armature in such a manner as to be brought into and out of engagement with the arresting ratchet by the movement of the armature, a wheel provided with teeth equal in number to the plates mounted on the shaft, a pawl in engagement therewith, and an arm to which the pawl is pivotally mounted, said arm being adjustably attached to the mounting, substantially as described.

Signed by me at Ravenna, Ohio, this fourteenth day of November, 1911.

LESTER J. GODDARD.

Witnesses:
 S. F. HAUSELMAN,
 LEWIS MORGAN.